UNITED STATES PATENT OFFICE 2,646,445

RESOLUTION PROCESS AND COMPOUNDS PRODUCED THEREIN

Robert L. Clark, Woodbridge, and William H. Jones, Elizabeth, N. J., assignors to Merck & Co., Inc., Rahway, N. J., a corporation of New Jersey No Drawing. Application December 1, 1950, Serial No. 198,758

11 Claims. (Cl. 260—472)

This invention relates to a resolution of racemic 1-amino-2-propanol into its two optically active isomers D(—) and L(+)-1-amino-2-propanol, and to new chemical compounds useful in the preparation of these optical isomers.

The individual optical isomers of 1-amino-2-propanol are old compounds useful in the preparation of optical isomers of more complex compounds, including products having biological activity. It has recently been found that D(—)-1-amino-2-propanol is one of the degradation products of vitamin $B_{12}$, and this isomer is therefore a substance useful in investigations of the structure and synthetic production of vitamin $B_{12}$.

Although the individual isomers of 1-amino-2-propanol have been known for a number of years, the only procedures for producing the individual isomers reported in the literature utilized as starting materials the corresponding optically active isomer of a different compound which is converted by a multi-step procedure to the desired isomer of 1-amino-2-propanol. By way of illustration, there is reported in J. Biol. Chem., 65, 49 (1925) a procedure for preparing optically active 1-amino-2-propanol from the optically active n-3-hydroxybutyric acid, and in J. Biol. Chem., 113, 153 (1936) there is disclosed a procedure which starts with the optically active isomer of 2-benzyloxy-propionic acid.

In an effort to resolve racemic 1-amino-2-propanol into its optical isomers directly, we have tried a number of procedures employing various agents normally useful in such resolution. In particular, we have prepared reaction products of racemic 1-amino-2-propanol and simple derivatives thereof such as racemic 1-benzylamino-2-propanol with a number of optically active acids, including d-tartaric acid, N-carbobenzoxy-d-glutamic acid, 1-malic acid, 1-mandelic acid, d-10-camphorsulfonic acid, 1-methoxyacetic acid, d-N-p-nitrobenzoylglutamic acid, d-α-bromocamphor-π-sulfonic acid ammonium salt, and N,N'-dicarbobenzoxy-L-cystine, but none of the reaction products thus obtained have provided a means for separating the two isomers of 1-amino-2-propanol. Our experience therefore supplements the implication in the prior art disclosure that the preparation of optically active isomers of 1-amino-2-propanol from the racemic product by conventional procedures is not possible.

We have now discovered in accordance with the present invention a simple and practical process for resolving 1-amino-2-propanol into its optically active isomers, wherein the 1-amino-2-propanol is first converted to a new derivative, i. e., 2-(1-benzylaminopropyl)-p-nitrobenzoate; this derivative is reacted with d-tartaric acid to form a diastereoisomeric mixture of D(—) and L(+)-2-(1-benzylaminopropyl)-p-nitrobenzoate d-acid tartrate; the D(—) and L(+) diastereoisomeric tartrates are separated by means of preferential solvents; and the separate diastereoisomers are then reconverted to the individual optical isomers of 1-amino-2-propanol.

The overall process in accordance with our invention is represented by the following series of reactions:

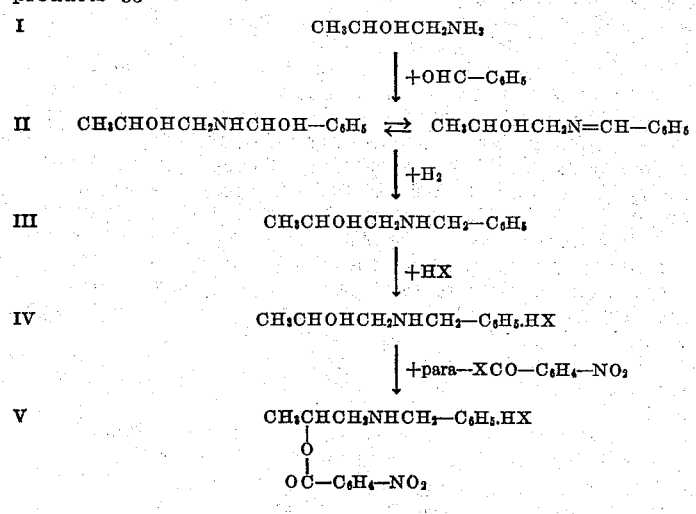

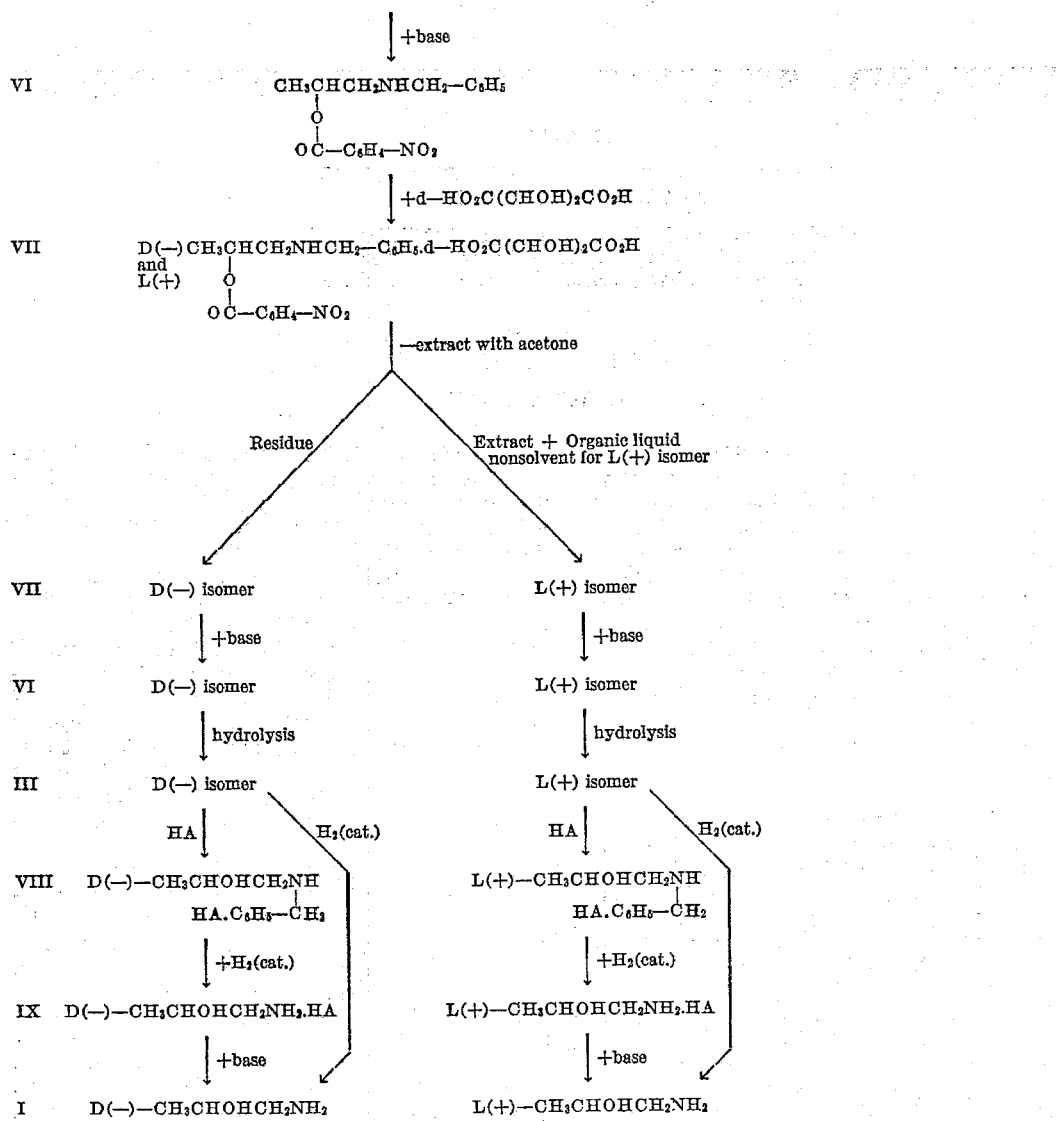

In the foregoing reactions X is the same in each instance and is selected from the group consisting of chlorine and bromine, and A is the anion of an acid unaffected by hydrogenation.

In carrying out the foregoing reaction 1-amino-2-propanol is dissolved in a suitable solvent such as methanol, ethanol, propanol, or dioxane and an approximately equimolecular amount of benzaldehyde is added in small portions with agitation and cooling to control the exothermic reaction thereby forming what is believed to be an equilibrium mixture of 1-(α-hydroxybenzylamino)-2-propanol and N-benzylidene-1-amino-2-propanol (II). (This reaction is disclosed in Helv. Chim. Acta., 5, 888 (1922).) II is hydrogenated to form 1-benzylamino-2-propanol (III). The hydrogenation may be either chemical, employing sodium and alcohol, for example, or catalytic, employing one of the hydrogenation catalysts Raney nickel, platinum, or palladium. Catalytic hydrogenation is preferred for ease of operation. Catalytic hydrogenation must be carried out under relatively mild conditions to avoid hydrogenolysis of the benzyl group, and for this reason, Raney nickel is the preferred catalyst.

The 1-benzylamino-2-propanol is dissolved in chloroform and the solution is saturated with hydrogen chloride or hydrogen bromide to form the corresponding hydrohalide (IV), thus protecting the secondary amino group. The hydrohalide (IV) is acylated with p-nitrobenzoyl chloride or bromide to form 2-(1-benzylaminopropyl)-p-nitrobenzoate hydrochloride or hydrobromide (V). It is desirable that only one anion be present in solution, otherwise the product will be a mixture of salts and therefore more difficult to isolate. For this reason, the halogen of the hydrohalic acid is preferably the same as that of the acyl halide. For the same reason, a hydrohalic acid is employed, rather than one of a number of other acids which would serve as well to protect the amino group.

The 2-(1-benzylaminopropyl)-p-nitrobenzoate hydrohalide is reacted with a base, as for example by agitating a suspension thereof in aqueous sodium hydroxide, to form the free base (VI) which is taken up in ether and reacted with d-tartaric acid to form a diastereoisomeric mixture of the 2-(1-benzylaminopropyl)-p-nitrobenzoate d-acid tartrates (VII), which may be obtained readily in crystalline form. The D(−)- and L(+)-diastereoisomeric tartrates are then separated from each other by employing various organic solvents, making use of the different solubilities of these isomers in the solvents. A convenient separation involves extracting the tartrate mixture with acetone to remove the L(+)-isomer (pure, crystalline D(−)-isomer remaining), crystallizing predominantly L(+)-isomer from a concentrate of the acetone extracts by the addition of an organic liquid which is a nonsolvent for the L(+)-isomer, such as ether, extracting the latter crystals with cold methanol to remove D(—)-isomer present, and recrystallizing the extracted crystals to yield pure, crystalline L(+)-isomer.

The individual isomers (VII) are converted to the free bases (VI) and subjected to alkaline hydrolysis to form the isomers of III. Alternatively, acid hydrolysis may be employed.

The isomers of III are preferably converted to acid salts (VIII) and are then catalytically hydrogenated to remove the benzyl group, thus forming acid salts of the isomers of 1-amino-2-propanol (IX). Either a platinum or a palladium catalyst may be employed. The isomers of IX are then converted to the corresponding D(—) and L(+)-isomers of 1-amino-2-propanol (I) by neutralization of a solvent solution, such as an ethanol solution, with a dry base and fractional distillation.

Alternatively, but less desirably, the isomers of III can be hydrogenated directly, to form the D(—) and L(+)-isomers of 1-amino-2-propanol.

The following example will show how procedures in accordance with the present invention can be carried out, but it is to be understood that this example is given by way of illustration and not of limitation.

EXAMPLE

*1-benzylamino-2-propanol.*—To a solution of 300 g. (4 moles) of 1-amino-2-propanol in 400 ml. of ethanol was added 424 g. (4 moles) of benzaldehyde in small portions with shaking. After about half of the benzaldehyde had been added another 250 ml. of ethanol was added to cool the reaction. At the end the temperature had risen to 50–60° C. The mixture was cooled to room temperature and the total volume of ethanol brought to 1200 ml. Hydrogenation was carried out at 1800 lbs./sq. in. pressure at room temperature with 6 g. of Raney nickel catalyst and was complete after 12 hours. The catalyst was removed by filtration and the solvent removed in vacuo. The yellow oily residue was distilled through a Vigreaux column at 3 mm., the fractions boiling at 120–130° C. being taken; $n_D^{25} = 1.5268$. The yield was 541 g. or 82%. Another 25 g. was obtained by combining the first impure fraction and the residue and redistilling.

*2-(1-benzylaminopropyl)-p-nitrobenzoate hydrochloride.*—A solution of 331 g. (2 moles) of 1-benzylamino-2-propanol in 600 ml. of dry chloroform was saturated at 0° C. with dry hydrogen chloride. A solution of 376 g. (2.02 moles) of p-nitrobenzoyl chloride in 600 ml. dry chloroform was added and the volume brought to 2300 ml. with dry chloroform. The mixture was heated to the point of refluxing for seventy hours. The chloroform was removed in vacuo and the light yellow solid triturated with 1 l. of ether, cooled for two hours, filtered, and washed with ether. The crude material on recrystallization from 5 liters of methanol gave 270 g. of soft, fiber-like crystals, M. P. 222–223° C. Concentration of the mother liquors gave 36 g. of material M. P. 217–221° C. The yield of first and second crop material was 43.5%.

Anal.:
  Calcd. for $C_{17}H_{18}N_2O_4 \cdot HCl$ C, 58.20; H, 5.46; N, 7.99.
  Found: C, 58.06; H, 5.25; N, 8.10.

*D(—) and L(+)-2-(1-benzylaminopropyl)-p-nitrobenzoate acid tartrate.*—A suspension of 20 g. of 2-(1-benzylaminopropyl)-p-nitrobenzoate hydrochloride in 250 ml. of 2.5 N sodium hydroxide was rapidly stirred mechanically with 400 ml. of ether until all traces of the solid disappeared. The aqueous layer was separated and extracted with 120 ml. of ether. The combined ether extracts were washed with three 80-ml. portions of water. After drying with anhydrous magnesium sulfate, the ether solution of the free base, 2-(1-benzylaminopropyl)-p-nitrobenzoate, was added slowly with stirring to a solution of 9 g. of d-tartaric acid in 30 ml. of ethanol and 500 ml. of ether. The sticky precipitate and milky suspension partially crystallized after standing sixteen hours. The mixture was removed by filtration and crystallized from about 2000 ml. of acetone.

*Resolution.*—The recrystallized material (13.5 g.) was refluxed with 250 ml. of acetone for one hour and filtered. This was repeated until the fine crystals remaining undissolved gave $$[\alpha]_D^{25} = -30°$$

(C, 1 in methanol). The combined acetone filtrates were cooled and the solid thus obtained was treated in a similar manner. The yield of D(—)-2-(1-benzylaminopropyl)-p-nitrobenzoate d-acid tartrate was 9.9 g., M. P. 135–137° C., 71%.

Anal.:
  Calcd. for $C_{21}H_{24}O_{10}N_2 \cdot H_2O$ C, 52.28; H, 5.43; N, 5.81.
  Found: C, 52.41; H, 5.21; N, 5.57.

The acetone filtrates were all combined and concentrated to a yellow sirup. On addition of ether, light tan crystals formed which were removed by filtration. Trituration of this material rapidly with ten times its volume of cold methanol gave granular crystals $[\alpha]_D^{25} = +50°$ (C, 1 in methanol), M. P. 145–146° C. The L(+)-2-(1-benzylaminopropyl)-p-nitrobenzoate-d-acid tartrate thus obtained could be recrystallized from methanol-ether, M. P. 145–148° C.

Anal.:
  Calcd. for $C_{21}H_{24}O_{10}N_2$ C, 54.31; H. 5.21; N, 6.03.
  Found: C, 54.32; H, 5.21; N, 5.89.

*D(—) and L(+)-1-benzylamino-2-propanol hydrochloride.*—To a solution of 24 g. of D(—)-2-(1-benzylaminopropyl)-p-nitrobenzoate acid tartrate in 200 ml. of warm methanol was added a solution of 45 g. of potassium hydroxide in 200 ml. of methanol. An immediate precipitate of potassium tartrate separated. This precipitate was removed by filtration, heated with 100 ml. of methanol and refiltered. The combined filtrates were heated under reflux for seventeen hours to hydrolyze the ester. The solvent was removed in vacuo. As soon as solid began to separate water was added to maintain a solution. After the methanol was removed, the aqueous solution was extracted with five 80-ml. portions of ether. The combined ether solution was washed, dried, and the solvent removed by distillation. The remaining oil was dissolved in 75–100 ml. of dry ether and dry hydrogen chloride added. The resulting precipitate was collected and crystallized from 30 ml. of ethanol by the slow addition of 200 ml. of ether, yield of D(—)-1-benzylamino-2-propanol hydrochloride, 7.1 g., M. P. 124–125° C., $[\alpha]_D^{25} = -28.4°$ (C, 1 in methanol).

Anal.:
  Calcd. for $C_{10}H_{15}ON \cdot HCl$ C, 59.54; H, 8.00; N, 6.95.
  Found: C, 59.60; H, 7.99; N, 6.88.

L(+)-1-benzylamino-2-propanol hydrochloride was obtained in the same manner as described for the D-isomer, M. P. 125–126° C., $[\alpha]_D^{25} = +28.4°$ (C, 1 in methanol).

Anal.:
  Calcd. for $C_{10}H_{15}ON \cdot HCl$ C, 59.54; H, 8.00; N, 6.95.
  Found: C, 59.27; H, 7.91; N, 6.69.

*D(−) and L(+)-1-amino-2-propanol hydrochloride.*—A solution of 7.0 g. of D(−)-1-benzylamino-2-propanol hydrochloride in 100 ml. of methanol was hydrogenated at 40 lbs./sq. in. pressure and at room temperature using 1.5 g. of 5% palladium on Darco. After twenty-four to thirty hours the theoretical amount of hydrogen was absorbed. The catalyst was removed by filtration and the solvents removed in vacuo. The residue was crystallized from 20 ml. of ethanol by the addition of 100 ml. of ether. After one more crystallization, the hygroscopic product, D(−)-1-amino-2-propanol hydrochloride melted at 94–95° C., $[\alpha]_D^{25} = -31.5°$ (C, 1 in methanol), yield 3 g.

Anal.:
  Calcd. for $C_3H_9NO \cdot HCl$ C, 32.29; H, 9.03; N, 12.59.
  Found: C, 32.32; H, 8.74; N, 12.40.

L(+)-1-amino-2-propanol hydrochloride was prepared in the same manner, $[\alpha]_D^{25} = +34°$ (C, 1 in methanol, M. P. 93–95° C.

Anal.:
  Calcd. for $C_3H_9NO \cdot HCl$ C, 32.29; H, 9.03.
  Found: C, 32.22; H, 8.80.

The isomeric alcohols can be obtained from the corresponding hydrochlorides by dissolving the hydrochlorides in ethanol, adding an equivalent amount of solid potassium carbonate, filtering, and fractionally distilling the filtrate. The ethanol distills first and then the amino alcohol.

Various changes and modifications in the foregoing procedures will occur to those skilled in the art; and to the extent that such changes and modifications are embraced by the appended claims, it is to be understood that they constitute part of our invention.

We claim:

1. The process that comprises hydrogenating the product obtained by reacting together an organic solvent solution of 1-amino-2-propanol and benzaldehyde to form 1-benzylamino-2-propanol, reacting the same with a hydrohalic acid selected from the class consisting of hydrochloric acid and hydrobromic acid, acylating the hydrohalide thus obtained by reacting with the corresponding p-nitrobenzoyl-halide to form the 2-(1-benzylamino-propyl)-p-nitrobenzoate hydrohalide, reacting said hydrohalide with alkali and dissolving the free base thus obtained in ether, adding said ether solution under anhydrous conditions to an ethanol-ether solution of d-tartaric acid, and extracting the diastereoisomeric mixture of 2-(1-benzylaminopropyl)-p-nitrobenzoate d-acid tartrates thus obtained with acetone to separate an acetone solution of the L(+) isomer from residual D(−) isomer.

2. The process that comprises hydrogenating the product obtained by reacting together an organic solvent solution of 1-amino-2-propanol and benzaldehyde to form 1-benzylamino-2-propanol, reacting the same with a hydrohalic acid selected from the class consisting of hydrochloric acid and hydrobromic acid, acylating the hydrohalide thus obtained by reacting with the corresponding p-nitrobenzoyl-halide to form the 2-(1-benzylamino-propyl)-p-nitrobenzoate hydrohalide, reacting said hydrohalide with alkali and dissolving the free base thus obtained in ether, adding said ether solution under anhydrous conditions to an ethanol-ether solution of d-tartaric acid, extracting the diastereoisomeric mixture of 2-(1-benzylaminopropyl)-p-nitrobenzoate d-acid tartrates thus obtained with acetone to separate an acetone solution of the L(+) isomer from residual D(−) isomer, and separately converting said isomers to the corresponding L(+) and D(−) isomers of 1-amino-2-propanol by reacting with a base to remove the d-acid tartrate group, hydrolyzing off the p-nitrobenzoyl group, and hydrogenating to remove the benzyl substituent of the 1-amino group.

3. The process separating the isomeric components of a diastereoisomeric mixture of 2-(1-benzylaminopropyl)-p-nitrobenzoate d-acid tartrates that comprises extracting said mixture with acetone to form a crystalline residue of the D(−)-acid tartrate and an acetone solution comprising predominantly the L(+)-acid tartrate.

4. The process that comprises extracting a diastereoisomeric mixture of 2-(1-benzylaminopropyl)-p-nitrobenzoate d-acid tartrates with acetone to form a crystalline residue of the D(−)-acid tartrate and an acetone solution comprising predominantly the L(+)-acid tartrate, adding ether to the acetone solution to crystallize the L(+)-acid tartrate, and extracting the latter crystals with methanol to remove any residual D(−)-acid tartrate.

5. A compound selected from the group consisting of 2-(1-benzylaminopropyl)-p-nitrobenzoate and acid addition salts thereof.

6. 2-(1-benzylaminopropyl)-p-nitrobenzoate.

7. 2-(1-benzylaminopropyl)-p-nitrobenzoate hydrohalide.

8. 2-(1-benzylaminopropyl)-p-nitrobenzoate hydrochloride.

9. 2-(1-benzylaminopropyl)-p-nitrobenzoate d-acid tartrate.

10. D(−)-2-(1-benzylaminopropyl)-p-nitrobenzoate d-acid tartrate.

11. L(+)-2-(1-benzylaminopropyl)-p-nitrobenzoate d-acid tartrate.

ROBERT L. CLARK.
WILLIAM H. JONES.

No references cited.